United States Patent
Honda et al.

(10) Patent No.: US 8,591,716 B2
(45) Date of Patent: *Nov. 26, 2013

(54) PROCESS OF MAKING A SEMICONDUCTOR OPTICAL LENS AND A SEMICONDUCTOR OPTICAL LENS FABRICATED THEREBY

(75) Inventors: Yoshiaki Honda, Souraku-gun (JP); Takayuki Nishikawa, Osaka (JP); Tomohiro Kamitsu, Kobe (JP)

(73) Assignee: Panasonic Corporation, Kadoma-shi (JP)

( * ) Notice: Subject to any disclaimer, the term of this patent is extended or adjusted under 35 U.S.C. 154(b) by 1178 days.

This patent is subject to a terminal disclaimer.

(21) Appl. No.: 11/990,876

(22) PCT Filed: Aug. 24, 2006

(86) PCT No.: PCT/JP2006/317159
§ 371 (c)(1),
(2), (4) Date: Apr. 7, 2008

(87) PCT Pub. No.: WO2007/024019
PCT Pub. Date: Mar. 1, 2007

(65) Prior Publication Data
US 2009/0092367 A1    Apr. 9, 2009

(30) Foreign Application Priority Data
Aug. 26, 2005   (JP) .................. 2005-246778

(51) Int. Cl.
*C25D 11/32*    (2006.01)
(52) U.S. Cl.
USPC ............ 205/157; 205/220; 205/223; 205/324

(58) Field of Classification Search
USPC ..................................................... 205/157
See application file for complete search history.

(56) References Cited

U.S. PATENT DOCUMENTS

| | | | |
|---|---|---|---|
| 4,415,414 A | 11/1983 | Burton et al. | |
| 4,812,221 A * | 3/1989 | Madou et al. | 204/412 |
| 5,370,768 A * | 12/1994 | Mersereau et al. | 216/26 |
| 5,853,960 A | 12/1998 | Tran et al. | |
| 5,910,040 A * | 6/1999 | Moriyasu et al. | 451/5 |

(Continued)

FOREIGN PATENT DOCUMENTS

| | | |
|---|---|---|
| EP | 1063688 | 12/2000 |
| JP | 55013960 A * | 1/1980 |

(Continued)

OTHER PUBLICATIONS

Mescheder et al., "3D Structuring of c-Si Using Porous Silicon as Sacrificial Material" Nanotech., 2002, IEEE-Nano (2002).*

(Continued)

*Primary Examiner* — Harry D Wilkins, III
*Assistant Examiner* — Bryan D. Ripa
(74) *Attorney, Agent, or Firm* — Edwards Wildman Palmer LLP (57) ABSTRACT

A semiconductor substrate with anode pattern is anodized to be shaped into an optical lens. The anodization utilizes an electrolytic solution which etches out oxidized portion as soon as it is formed as a result of the anodization, to thereby develop a porous layer in a pattern in match with the anode pattern. After being removed of the porous layer, the substrate is treated to smooth out minute projections remaining in the top surface of the substrate, thereby obtaining the lens of good transmissivity.

13 Claims, 8 Drawing Sheets

(56) References Cited

U.S. PATENT DOCUMENTS

| | | | |
|---|---|---|---|
| 6,133,062 A | 10/2000 | Pai et al. | |
| 6,359,367 B1 * | 3/2002 | Sumanaweera et al. | 310/309 |
| 6,805,588 B2 | 10/2004 | Yamamoto | |
| 7,718,970 B2 * | 5/2010 | Honda et al. | 250/353 |
| 7,749,868 B2 * | 7/2010 | Honda et al. | 438/466 |
| 2003/0048349 A1 * | 3/2003 | Yamada et al. | 347/224 |
| 2005/0199511 A1 * | 9/2005 | Kochergin et al. | 205/641 |
| 2006/0121751 A1 | 6/2006 | Liao | |

FOREIGN PATENT DOCUMENTS

| | | |
|---|---|---|
| JP | 11-298046 A | 10/1999 |
| JP | 2000-263556 | 9/2000 |
| JP | 2003-273067 A | 9/2003 |
| TW | 369726 | 9/1999 |
| TW | 273840 Y | 8/2005 |

OTHER PUBLICATIONS

Chen et al., "Silicon Microlens Structures Fabricated by Scanning-Probe Gray-Scale Oxidation" Optics Letters 30(6) (Mar. 15, 2005).*

Yahata et al., "Smoothing of Si Trench Sidewall Surface by Chemical Dry Etching and Sacrificial Oxidation" Jpn. J. Appl. Phys. 37, pp. 3954-3955 (1998).*

Fletcher et al., "Near-Field Infrared Imaging with a Microfabricated Solid Immersion Lens" Appl. Phys. Lett. 77(14), pp. 2109-2111 (2000).*

English Absract of JP 55-13960A.*

Notice of Allowance dated Dec. 25, 2009, issued in the corresponding Taiwanese Patent Application.

Man-Lyun Ha et al., "An oxidized porous silicon (OPS) microlens implemented on thick OPS membrane for a silicon-based optoelectronic-multichip module (OEMCM)," IEEE Photonics Technology Letiers IEEE USA, vol. 16, No. 6, Jun. 2004, pp. 1519-1521, XP002406087.

Choong-Mo Nam et al., "Selective oxidized porous silicon (SOPS) substrate for microwave power chip-packaging," Electrical Performance of Electronic Packaging IEEE New York, NY, USA, 1996, pp. 202-204, XP002406088.

Didier Hamm et al., "Porous silicon formation under constant anodization conditions: homogeneous regime or transition?," Journal of the Electrochemical Society Electrochem. Soc USA, vol. 151, No. 1, Jan. 2004, pp. C32-C37, XP002406089.

S. E. Foss et al., "Single beam determination of porosity and etch rate in situ during etching of porous silicon," Journal of Applied Physics, American Institute of Physics. New York, US, vol. 97, No. 11, May 31, 2005, pp. 114909-1-114909-11, XP012070305.

C. B. Zarowin, "Comparison of the smoothing and shaping of optics by plasma-assisted chemical etching and ion milling using the surface evolution theory," Applied Optics USA, vol. 32, No. 16, Jun. 1, 1993, pp. 2984-2991, XP002406264.

International Search Report mailed on Dec. 12, 2006 and Written Opinion of the International Searching Authority issued in PCT/JP2006/317159.

Notification of Reason(s) for Refusal mailed Jan. 23, 2007, issued on the Japanese application No. 2006-228273 and the English translation thereof.

Office Action dated Sep. 30, 2009, issued in the prosecution of the Taiwanese patent application and the English translation thereof.

Xie Jin et al., "Single-point diamond mirror turning of infrared aspheric lens," Optics and Precision Engineering, vol. 12 No. 6, pp. 566-569, Dec. 2004.

Office Action dated Oct. 30, 2009, issued on the Chinese patent application No. 200680031177.1.

* cited by examiner

PROCESS OF MAKING A SEMICONDUCTOR OPTICAL LENS AND A SEMICONDUCTOR OPTICAL LENS FABRICATED THEREBY

TECHNICAL FIELD

The present invention is directed to a process for fabricating an optical lens from a body of semiconductor substrate, and a semiconductor optical lens fabricated by the same process.

BACKGROUND ART

Japanese patent publication No. 2000-263556 discloses a process of making a mold for a micro optical lens. The mold is fabricated by steps of preparing a semiconductor substrate, providing a dielectric mask on a top surface of the substrate, forming one or more openings in the mask, placing the substrate in an electrolytic solution, and anodizing a portion in the top surface not covered by the mask to convert the portion into a porous zone. Thereafter, the porous zone is removed to leave a rounded convex in the top surface of the substrate. An ultraviolet curable resin is placed in the convex and is cured therein to obtain a convex lens. Although the prior art discloses the formation of the porous zones, the process relies upon the mask with the opening so that the porous zone develops isotropically from the center of each opening. Accordingly, the resulting rounded convex is limited to have substantially a uniform radius of curvature. With this limitation, the process cannot be not adapted to fabricate optical lens having non-uniform radius of curvature or sophisticated surface profile.

Further, it is found that the rounded convex revealed by removal of the porous zone suffers from minute projections due to the fact that the porous zone leaves a relatively irregular interface with the semiconductor substrate. This irregularity may detract from lens transmissivity and is desired to be smoothed out when fabricating the lens of good transmissivity.

DISCLOSURE OF THE INVENTION

In view of the above problem, the present invention has been accomplished to provide an improved process of fabricating an optical lens of various surface profiles and also of good transmissivity.

The process according to the present invention utilizes a semiconductor substrate having a flat top surface and a flat bottom surface opposed to each other, and includes the steps forming an anode on the bottom surface, placing the semiconductor substrate in an electrolyte solution. Then, the steps are followed by flowing a current between the anode and a cathode within the solution to convert the top surface of the substrate to a varying depth from portions to portions, leaving a resulting porous layer in the top surface, and removing the porous layer from the substrate to leave a curved surface on the top surface. The process is characterized by including a smoothing step of smoothening out minute projections remaining on the curved surface. Thus, the lens is finished to have a smoothly curved surface for improving transmissivity. In addition, since the anode can be configured to give the predetermined distribution of the electric field intensity varying from portions to portions of the substrate, it is easy to give continuously varying radius of curvature to the resulting curved surface. Further, because of that the anodization proceeds from the top surface of the substrate which is exposed entirely to the electrolyte solution, i.e., not covered or masked by a material restricting the anodization, and that the surface profile of the curved surface is controlled principally by the electric field intensity distribution given by the anode pattern on the bottom surface of the substrate, it is easy to develop the porous layer of accurately controlled contour or profile and therefore give the correspondingly accurate surface profile to the resulting lens. Accordingly, the process can be best utilized to fabricate the optical lens, especially a non-spherical lens with precisely controlled surface profile and good transmissivity.

The process may rely upon an etching technique of immersing the semiconductor substrate in a suitable etching solution after removing the porous layer. With this result, the minute projections can be preferentially etched out to give a smoothed curved surface to the lens.

Alternatively, the process may utilize a thermal oxidation to form an oxidized layer in the top of the curved surface. Also in this instance, the oxidation proceeds preferentially in the minute projections to selectively oxidize the minute projections so that the oxidized layer extends the minute projections and not proceed deep into the semiconductor substrate. Therefore, etching out the oxidized layer can reveal the smoothed surface on the curved surface to give the lens of smoothed surface.

Further, it is equally possible to utilize a plasma etching or laser ablation process in either of which the minute projections can be preferentially removed to provide a smoothed finish to the lens.

The above smoothening can assure to give the curved surface having a root mean square surface roughness (RMS) of 200 nm or less, which enables to reduce transmissivity lowering due to the surface irregularity as less as 10% or below, and therefore satisfies good transmissivity of the lens.

Moreover, the present invention gives a good solution of facilitating the above smoothening process by minimizing the projections formed at the interface between the semiconductor substrate and the porous layer. For this purpose, it is made to change a parameter of anodizing the top surface of the substrate with time while forming the porous layer in order to lower the porosity of the porous layer at the interface with the substrate than at the other portion. With this consequence, a control can be made to develop the porous layer with relatively large porosity until the porous layer reaches to the intended interface with the substrate, and with less porosity at the interface, thereby enabling to form and remove the porous layer efficiently, yet minimizing the projections or surface irregularity in accordance with the less porosity.

The parameter may be a current density of the current which flows through the anode and the cathode and which is controlled to decrease in the final stage of developing the porous layer to such a thickness that influence the surface smoothness.

Alternatively or in combination with the control of the current density, the electrolyte solution may be controlled to increase its concentration in the final stage of the forming the porous layer.

These and still other advantageous features of the present invention will become more apparent from the following detailed explanation when taking in conjunction with the attached drawings.

BEST MODE FOR CARRYING OUT THE INVENTION

Figure 1:
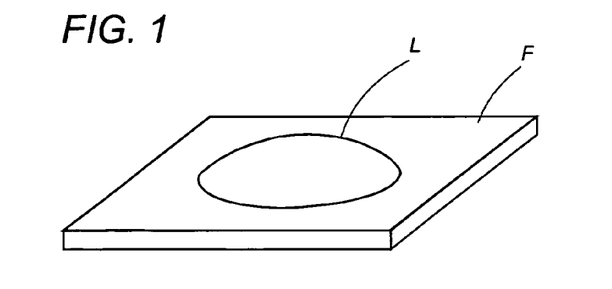
FIG. 1 is a perspective view of a plano-convex lens fabricated in accordance with a preferred embodiment of the present invention.
Figure 2:
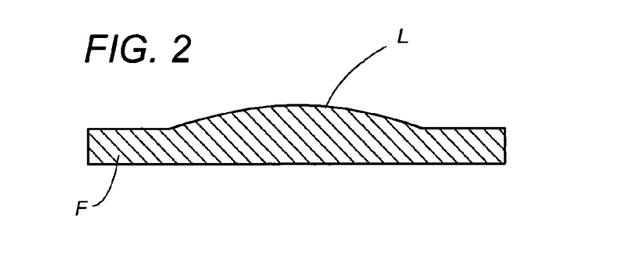
FIG. 2 is a sectional view of the lens.
Figure 3:
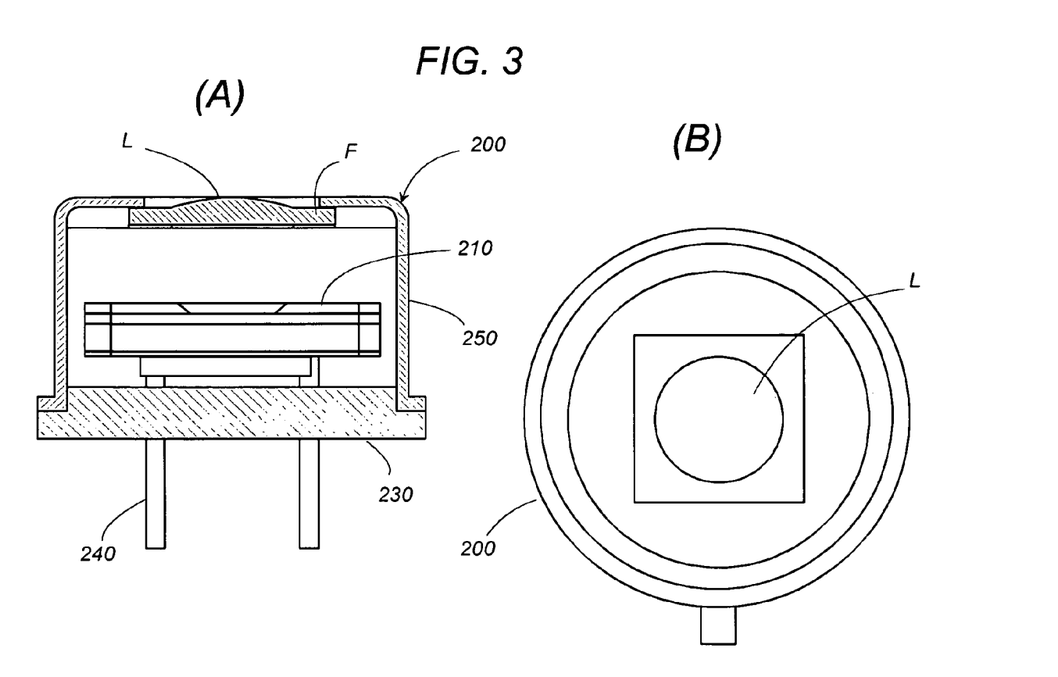
FIG. 3A is a sectional view illustrating a device in which the above lens is utilized.
FIG. 3B is a top view of the above device.
Figure 4:
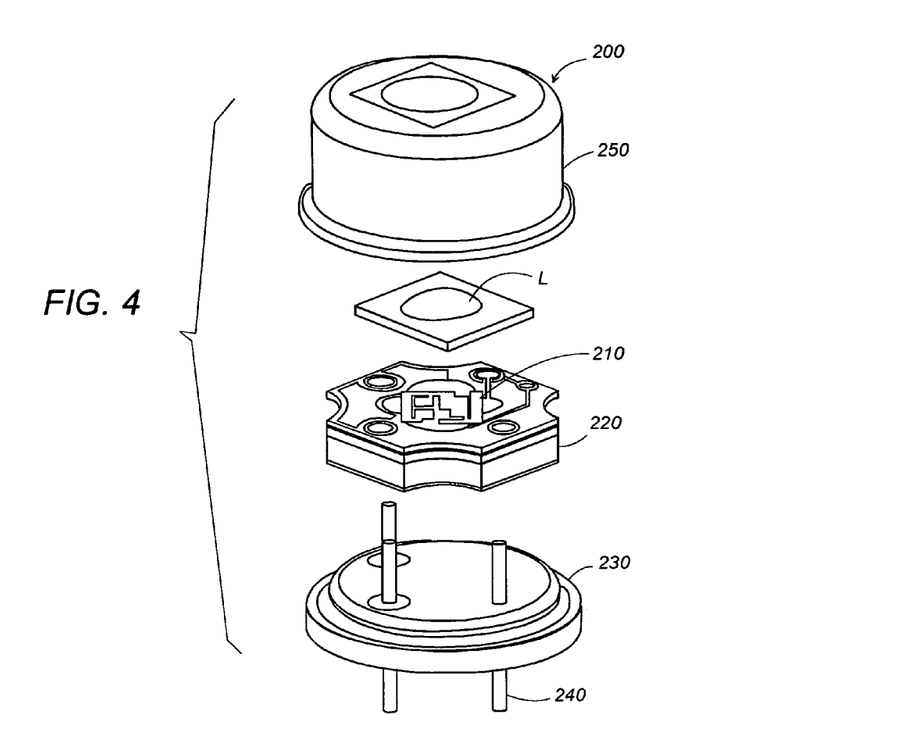
FIG. 4 is an exploded perspective view of the above device.

Referring to FIGS. 1 to 5, the present invention is now explained for fabrication of a plano-convex lens as one particular representative of a semiconductor optical lens in accordance with a preferred embodiment of the present invention. As shown in FIGS. 1 to 3, the lens L is configured to have an integral flange F which is utilized for mounting the lens in a device such as an optical sensor 200, which is one typical application of the lens and is configured to have a sensing element such as a pyroelectric element 210 as well as an associated electronic circuit module 220 to receive the light through the lens, as shown in FIGS. 3 and 4. The pyroelectric element 210 is carried on the circuit module 220 which is mounted on a base 230 having a plurality of terminal pins 240, while the lens L is supported by a cover 250.

Figure 5:
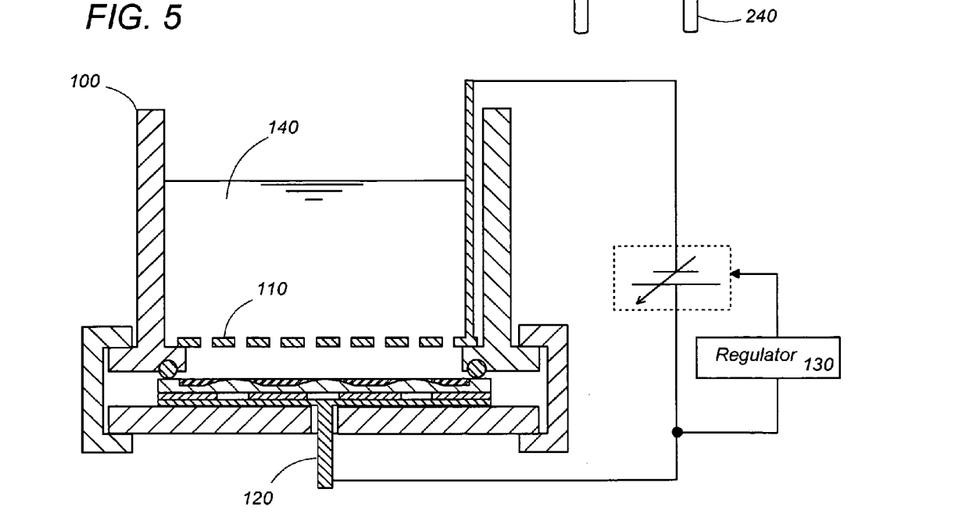
FIG. 5 is a sectional view of an anodizing apparatus utilized for making the process of the present invention.

The lens is made from a semiconductor material such as, silicon (Si), germanium (Ge), silicon carbide (SiC), gallium arsenide (GaAs), gallium phosphide (GaP), and indium phosphide (InP). In this embodiment, the semiconductor substrate 10 of p-type Si is utilized to fabricate the plano-convex lens by selective anodization of the substrate 10. The anodization is made by use of an anodizing apparatus 100 which, as shown in FIG. 5, is configured to place the substrate 10 within a volume of an electrolyte solution 140, and which is configured to be equipped with a regulator 130 for regulation of an electric current flowing between an anodic electrode 120 and a cathode 110 immersed in the solution. The anodic electrode 120 is held in contact with the bottom surface of substrate 10 in order to advance the anodization to a varying extent in the top surface opposed to the cathode 110. The anodic electrode 120 and cathodes 110 are both made of platinum or any other suitable metal.

Figure 6:
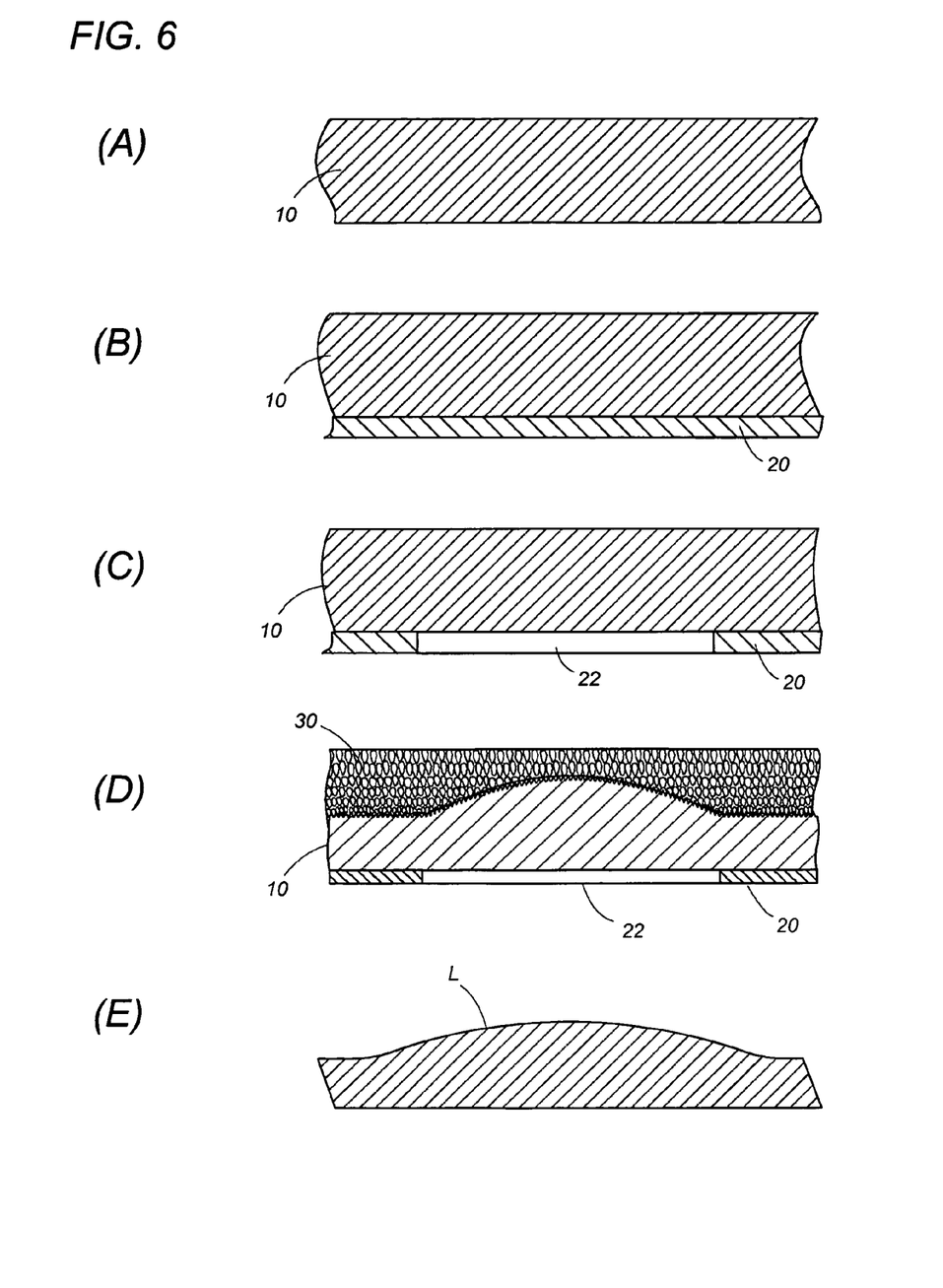
FIGS. 6A to 6E are sectional views illustrating the steps of forming the lens.

In this embodiment, the substrate 10 is selected to have a low resistance of several ohm centimeters (Ω·cm) to several hundreds ohm centimeters (Ω·cm). For example, a 0.5 mm thick flat p-type Si substrate 10 of 80 Ω·cm is shaped into the lens through the steps of FIGS. 6A to 6E. After being washed and cleaned, the substrate 10 is processed to have an electrically conductive layer 20 on the entire bottom surface (FIG. 6B). The conductive layer 20 is made of aluminum, for example, and is deposited by spattering or like technique on the substrate 10 to have a uniform thickness of 1 μm. Then, the conductive layer 20 is formed with a resist pattern by a photolithography, and is partially etched out by a wet-etching to leave a circular opening 22 of 2 mm diameters in match with a diameter of the lens to be fabricated to give a consolidated structure in which the conductive layer 20 defines an anode having an anode pattern integrated to the substrate 10 (FIG. 6C). The above etching is not limited to the wet-etching and may be made by a dry-etching. Hereinafter, the term "anode" is utilized in place of the conductive layer where it is deemed appropriate to explain the present invention. Subsequently, the substrate 10 is immersed within the electrolyte solution 140 in the anodizing apparatus 100 with the anode 20 in contact with the anodic electrode 120 and is followed by receiving an electric current flowing between the anode 20 and the cathode 110 so as to anodize the top surface of the semiconductor substrate 10 selectively in correspondence to the anode pattern, thereby developing a porous layer 30 in the top surface of the substrate 10 (FIG. 6D). The electric current is regulated by the regulator 130 to have a predetermined current density of 30 mA/cm², for example, and continue for a predetermined period of 120 minutes for example. Thereafter, the porous layer 30 and the anode 20 are etched out to obtain the lens (FIG. 6E).

The electrolyte solution utilized is an aqueous solution of hydrogen fluoride (HF) and ethanol mixed in a suitable ratio. In the anodization process, the following chemical reactions take place:

$$Si + 2HF + (2-n)h^+ \rightarrow SiF_2 + 2H^+ + n \cdot e^-$$

$$SiF_2 + 2HF \rightarrow SiF_4 + H_2$$

$$SiF_4 + 2HF \rightarrow SiH_2F_6$$

where h⁺ denotes a hole and e⁻ denotes an electron.

As soon as the Si substrate is anodically oxidized, the oxidized portion is removed by reaction with the electrolyte solution so as to leave the porous layer 30 in the surface of the substrate 10. Accordingly, the anodization proceeds without being retarded by the oxidized portion, which makes it possible to develop the porous layer 30 having a greater depth, and therefore enable to fabricate the lens of relatively great thickness.

Figure 7:
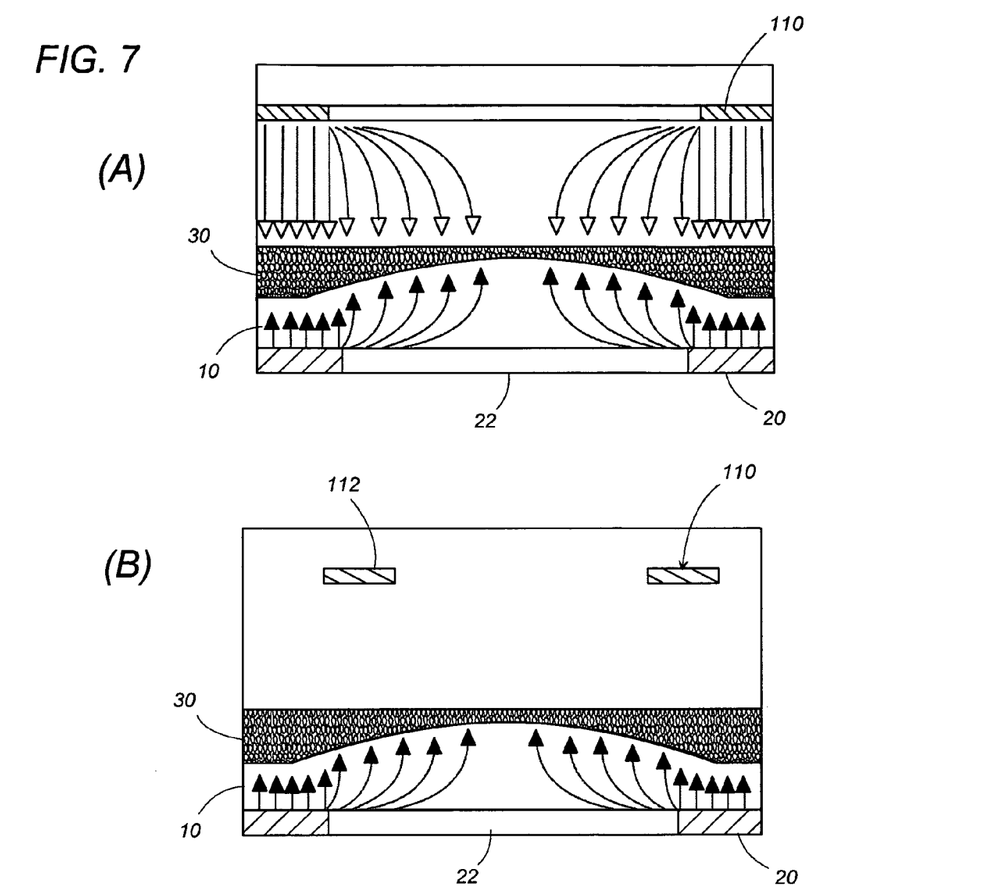
FIGS. 7A and 7B are schematic views illustrating electric field intensity distribution developed in the process of forming the lens.

As schematically shown in FIG. 7A, an in-plane electric field strength or current density is variably distributed in coincidence with the anode pattern. In the figure, the lines with black arrows indicate paths of the positive current flowing through the substrate 10, while the lines with white arrows indicate the paths of the electrons flowing through the substrate 10. Since the in-plane current density becomes denser towards the periphery of the opening 22 than at the center of the opening, the resulting porous layer 30 has a continuously varying depth which is greater towards the periphery of opening 22 than at the center of the opening. Consequently, the plano-convex lens is obtained by removal of the porous layer 30 and optionally by removal of the anode 20. The distribution of the in-plane electric field strength will be determined primarily by the anode pattern, and secondarily by the resistivity and the thickness of the substrate 10, resistance of the electrolyte solution 140, a distance between the substrate 10 and the cathode 110, and a planar configuration of the cathode 110 (i.e. cathode arrangement in a plane parallel to the substrate). Accordingly, it is readily possible to give any desired lens profile by suitably selecting these parameters in combination with the anode pattern. It should be noted here that since the anodization proceeds to develop the porous layer continuously without being retarded by otherwise appearing oxidized portions in the substrate, the thick lens can be easily fabricated in a single anodization process, which enhances flexibility of the lens design.

The resistance of the electrolytic solution 140 can be adjusted by the concentration of the aqueous solution of hydrogen fluoride (HF) and/or by a mixing ratio of HF to ethanol. The cathode 110 may be designed to have a pattern in exact coincident with the anode pattern as shown in FIG. 7A, or to have a pattern in which the opposing cathode elements 112 are offset slightly towards the center of the opening 22 of the anode pattern in a plane parallel to the substrate 10, as shown in FIG. 7B. The offset amount can be adjusted in relation with the current density as well as the distance to the substrate 10.

In the anodization process, the regulator 130 acts to keep the current density basically at a constant level. However, it is preferred to decrease the current density gradually in a final stage of the anodization process in order to correspondingly decrease the rate of developing the porous layer 30. With this technique, the porosity of the porous layer can be lowered by lowering the current density during the anodization, which minimizes surface irregularity on the curved surface revealed by removal of the porous layer, and therefore gives a more smooth surface finish to the resulting lens. The regulation of the current density is made by monitoring the current level or voltage level.

The removal of the porous layer 30 and the conductive layer 20 can be made by use of an alkali solution such as KOH, NaOH and TMAH (tetramethyl ammonium hydrooxide) or HF solution.

Figure 9:
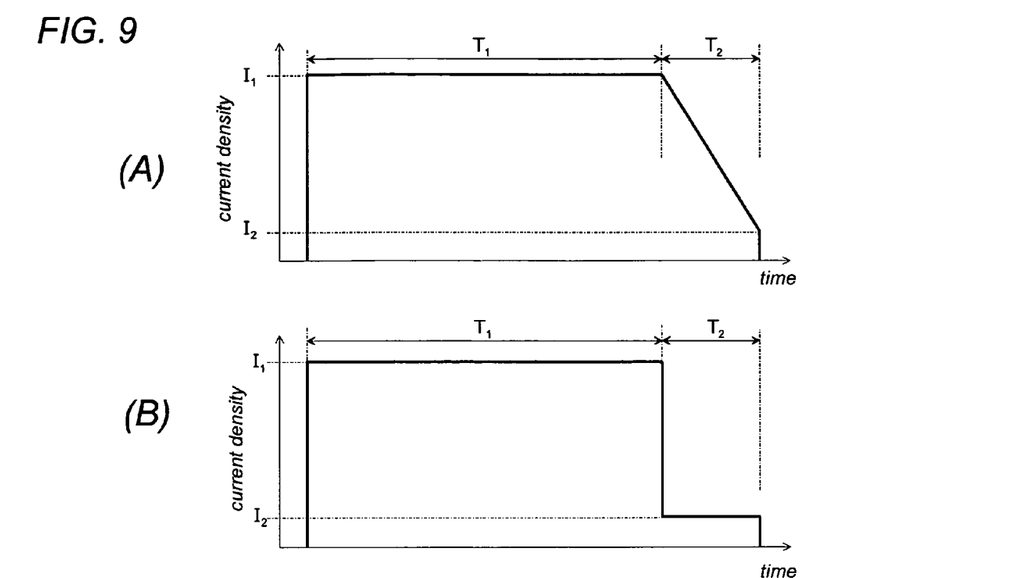
FIGS. 9A and 9B are graphs illustrating a control of developing the porous layer.
Figure 11:
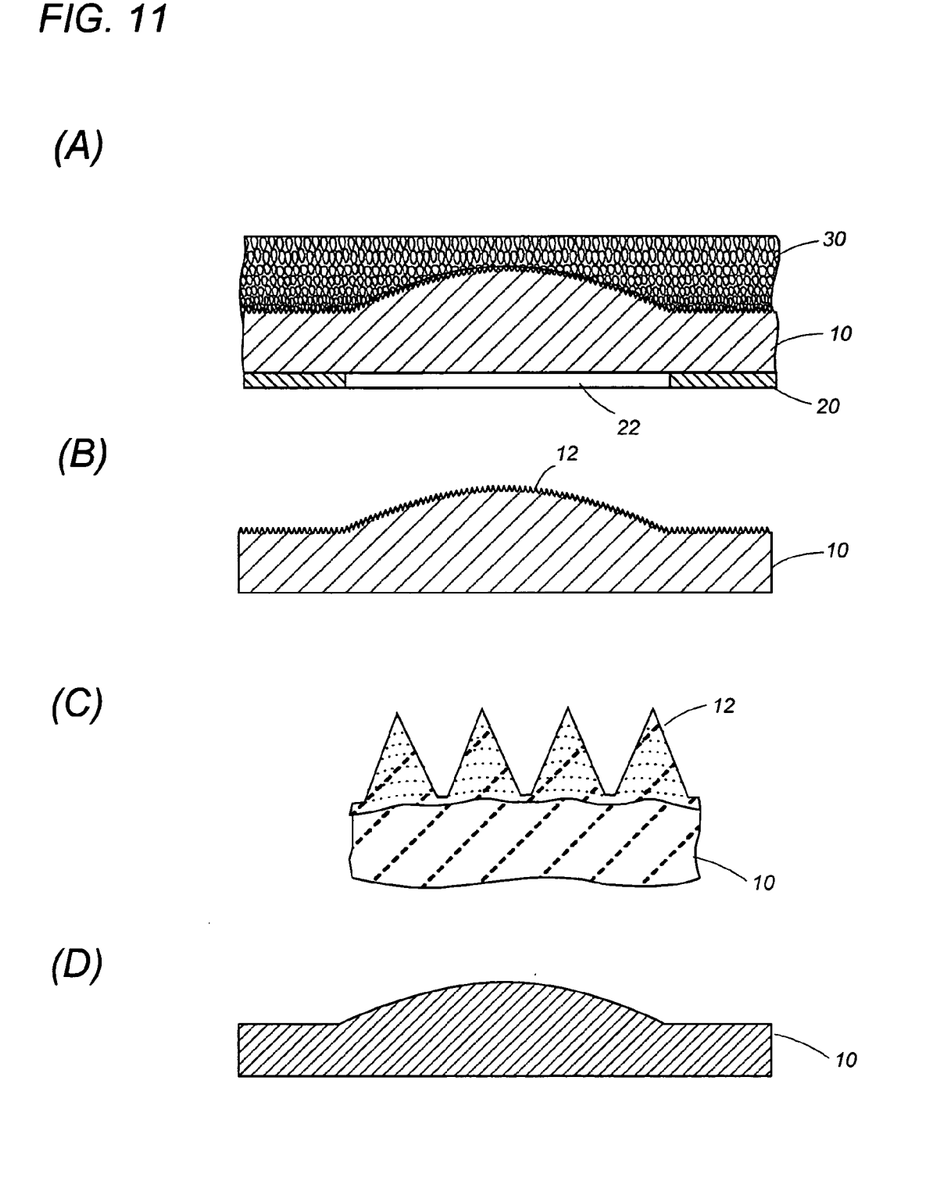
FIGS. 11A to 11D are sectional views illustrating a step of smoothening the lens surface.

FIGS. 9A and 9B show controls of decreasing the current density in the final stage of the anodization process, respectively by continuously lowering the current density from I1 (for example, 30 mA/cm$^2$) to I2 (for example, 5 mA/cm$^2$), or lowering the current density stepwise from I1 to I2. With this consequence, the anodization proceeds at a lowered rate to lessen the porosity at the interface with the substrate than at the other portions, as schematically shown in FIG. 11A, thereby leaving only minute projections on the resulting curved surface of the substrate 10 after the porous layer 30 is removed. It is noted that FIG. 11A illustrates the varying porosity in an exaggerated format only for the purpose of explaining the anodization process, and the size and distribution of pores does not reflect the actual ones. In view of that the porous layer is developed at a lower rate when lowering the current density to correspondingly lower the porosity, it is preferred to give the less porosity only at the final stage of developing the porous layer 30. In order to satisfy the requirement of rapidly etching out the porous layer 30 and at the same time of minimizing the projections on the curved surface of the substrate, T1 for anodization at a large current density I1 and time T2 for anodization at a reduced current density I2 are suitably selected. For instance, T1 and T2 are selected to be 30 minutes and 10 minutes, respectively.

Figure 10:
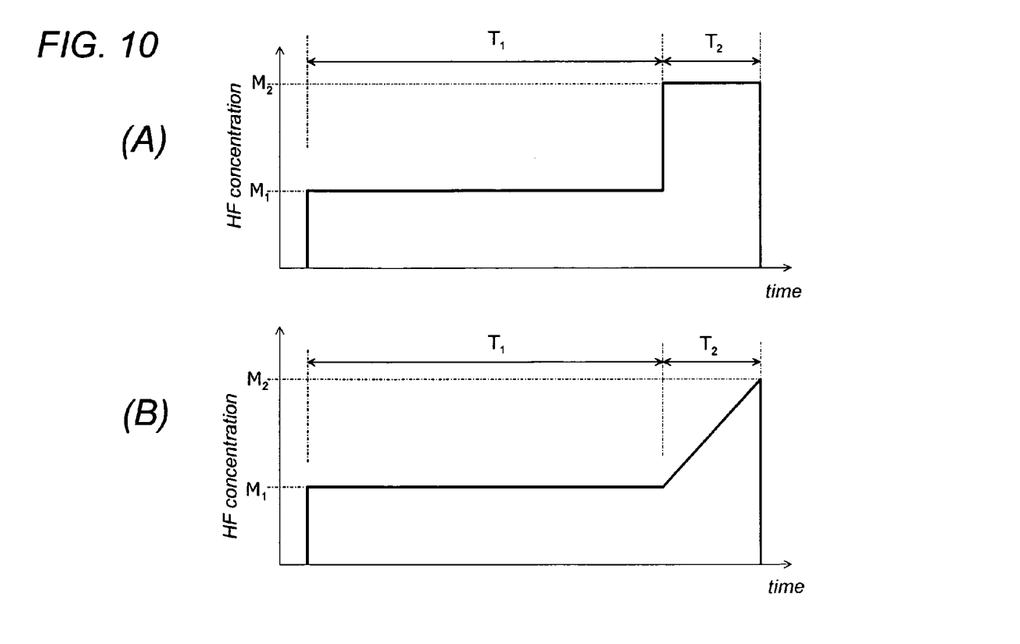
FIGS. 10A and 10B are graphs illustrating another control of developing the porous layer.

Alternatively or in combination with the control of the current density, it may be possible to control a concentration of the electrolytic solution, for example, HF concentration, to increase in the final stage of the anodization process, as shown in FIGS. 10A and 10B, by increasing the concentration either by stepwise from M1 to M2 or continuously from M1 to M2. The higher the concentration of the electrolytic solution, the more minute pores are developed with correspondingly lowered porosity to leave more minute projections on the surface of the substrate 10. Also, time T1 and T2 are suitable selected to facilitate the formation and removal of the porous layer, yet leaving only minute projections at the interface between the porous layer 30 and the substrate 10.

As shown in FIG. 11B, the minute projections 12 left on the substrate 10 are generally dimensioned to have an average height of 1 μm and spaced from each other at a distance of several μm. The surface irregularity is removed by a smoothing process following the removal of the porous layer 30. In the present embodiment, the substrate 10 removed of the porous layer 30 (shown in FIG. 11B) is immersed in a dry etching solution such as KOH, NaOH and TMAH (tetramethyl ammonium hydrooxide) or HF-based solution. In this process, the minute projections 12 on the substrate surface are selectively etched out as indicated by dotted lines in FIG. 11C, thereby leaving a smoothed surface on the substrate 10, as shown in FIG. 11D.

EXAMPLE

Figure 8:
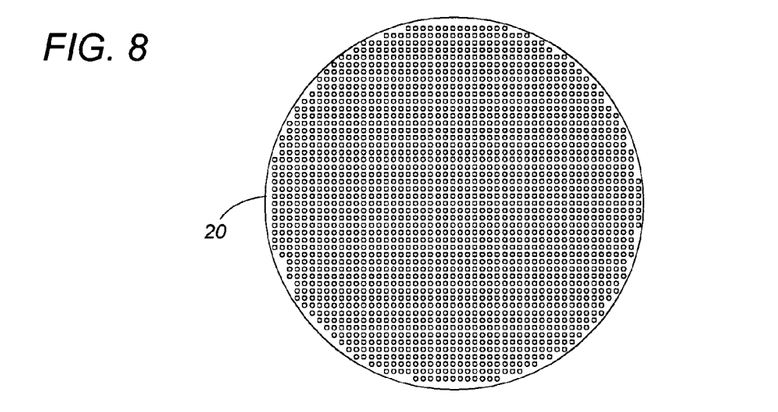
FIG. 8 is a plan view illustrating an anode pattern formed on the bottom surface of the semiconductor substrate.
Figure 12:
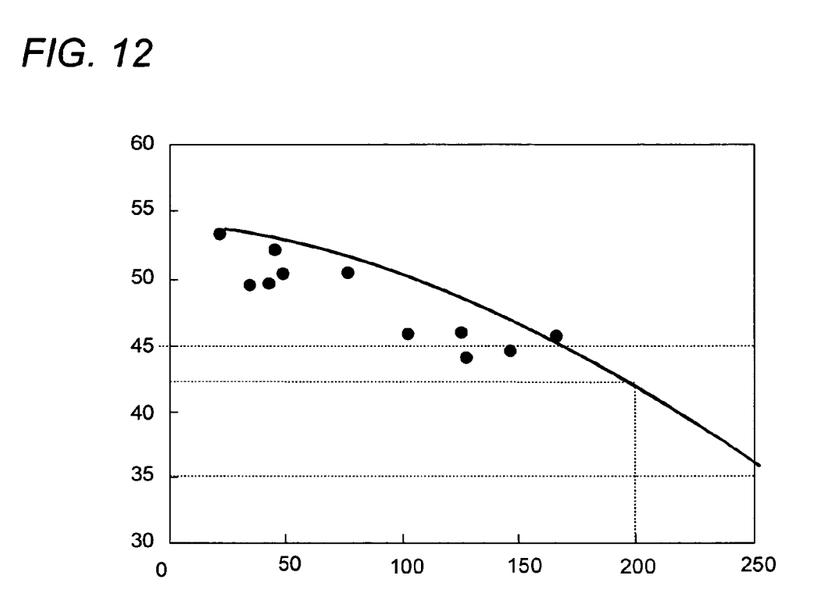
FIG. 12 is a graph illustrating a relation between transmissivity and surface roughness of the lens.

A 100 mm diameter p-type Si substrate 10 of 0.5 mm thick and 80 Ω·cm resistivity was formed on its bottom surface with a 1 μm thick aluminum conductive layer 20 by spattering. After sintering the conductive layer 20 at 420° C. for 20 minutes, the layer 20 was masked by photolithography with a resist pattern having a plurality of windows of 2 mm diameters. Then, the unmasked portion of the conductive layer 20 was etched out by dry-etching to form a plurality of 2 mm diameter openings 22 in the conductive layer, as shown in FIG. 8. After being removed of the resist pattern, the substrate 10 was placed in the anodizing apparatus of FIG. 5 containing the electrolytic solution comprised of an 1:1 ratio mixture of a 50% aqueous solution of hydrogen fluoride (HF) and ethanol. Then, the substrate was anodized at current density of 30 mA/cm$^2$ for 3 hours. The resulting porous layer 30 was found to have a 0.3 mm thick at the portion corresponding to the conductive layer 20 and to have a decreasing thickness towards the center of the opening 22 in a plane parallel to the substrate. The porous layer 30 and the conductive layer 20 were then etched out by a 10% aqueous solution of KOH over a period of 15 minutes, thereby forming a plurality of plano-convex lenses. Thereafter, the substrate 10 was immersed in an aqueous solution of HF for 1 hour o selectively etch out the minute projections 12 remaining on the surface of the substrate 10. The substrate 10 was then cut out into a plurality of the lens. The etching rate of removing the porous layer 30 was more than 10 times than that of removing the minute projections on the substrate 10. Thus formed lens were each configured to have a lens thickness of 0.195 mm and a root mean square surface roughness (RMS) of 50 nm FIG. 12 illustrates a relation between the root mean square surface roughness (RMS) and the transmissivity (%) of the infrared ray having a wavelength of 5 μm which represents one of radiation having a range of 5 μm to 10 μm wavelength emitted from a human and selected in view of that the infrared sensor is used for detection of human presence. In the graph of FIG. 12, black dots indicate measured roughness and the transmissivity, while a curve indicates a theoretical relation as expressed by the following equation.

$$T = \exp\left[-\left(\frac{4\pi\sigma}{\lambda^2}\right)\right],$$

where σ is a surface roughness

From the graph, the measured transmissivity is lowered with the increased surface roughness in line with the theoretical relation. For practical use, it is preferred to reduce the lowering of transmissivity due to scattering on the surface irregularity as less as 10% or less. In this respect, the lens is required to have a transmissivity of 42% or more with the surface roughness (RMS) of 200 nm or less. In this sense, the lens fabricated in the above example to have the surface roughness (RMS) of 50 nm can well satisfy the requirement, and the lens fabricated in the above process to have the surface roughness (RMS) of 200 nm or less is sufficient for practical use.

Figure 13:
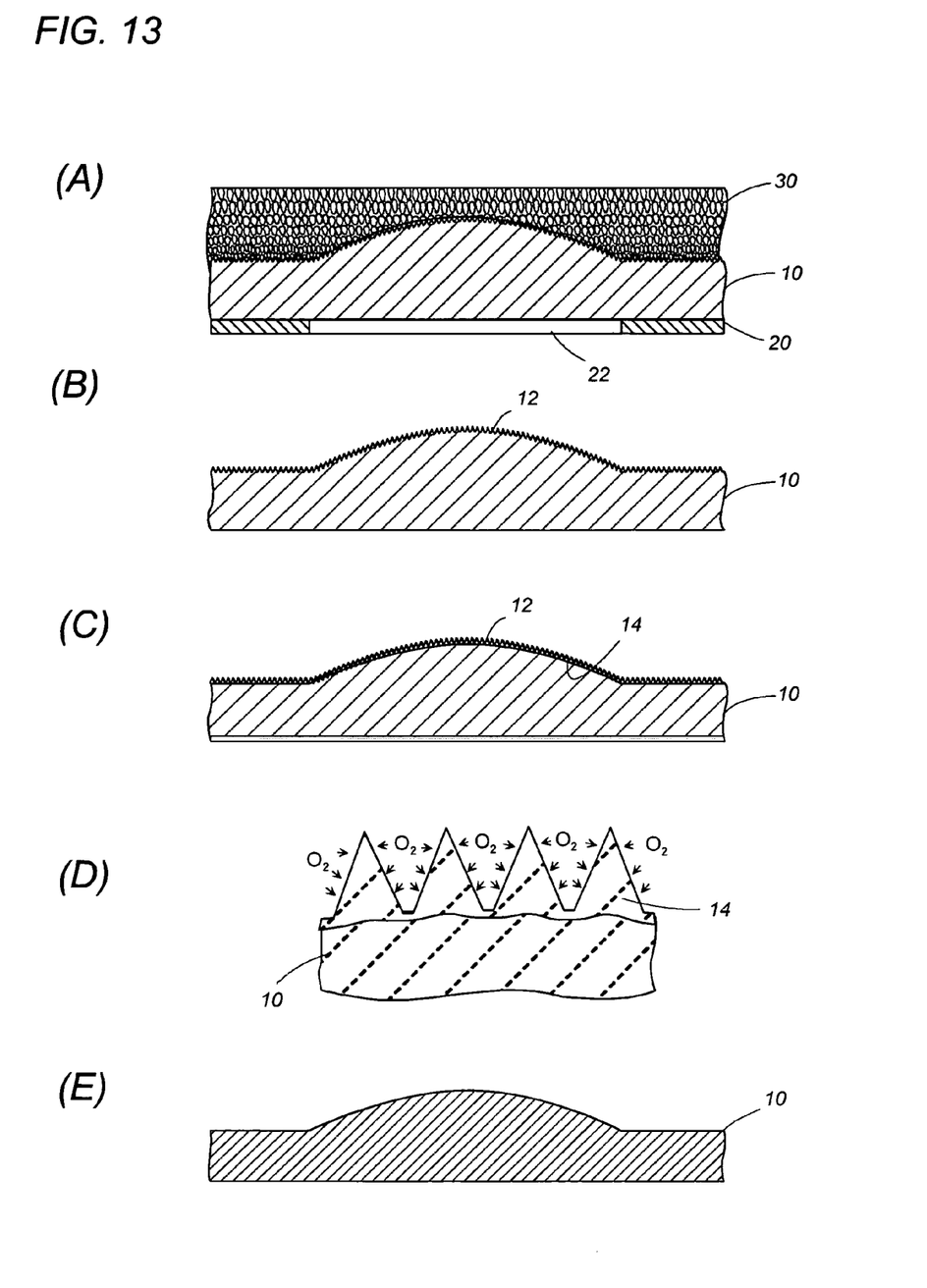
FIGS. 13A to 13E are sectional views illustrating another step of smoothening the lens surface.

Alternatively, the smoothening of the lens surface can be made by another process of thermally oxidizing the surface of the substrate followed by etching out the resulting oxidized layer, as shown in FIGS. 13A to 13E. Firstly, as shown in FIG. 13A, the porous layer 30 is formed in the top surface of the substrate 10 to give a curved interface between the porous layer 30 and the remaining substrate 10 in correspondence with the opening of the anode 20, i.e., the anode pattern in a manner as explained hereinbefore. The porous layer 30 is etched out to give the structure of FIG. 13B in which minute projections 12 remains in the top surface of the substrate 10. Subsequently, the substrate 10 is placed in an oxidation furnace and is heated so as to develop the oxidized layer 14 in the top surface of the substrate 10, as shown in FIG. 13C. In order to make the thermal oxidation, steam is introduced to the furnace to treat the substrate at a temperature of 1000° C. for 200 minutes to develop an oxidation layer of 0.4 μm thickness. During the thermal oxidation, oxidation of Si into $SiO_2$ proceeds uniformly in a direction normal to the surface of the substrate such that the oxidization proceeds preferentially at the projections 12 than the other portion to smooth the top surface of the substrate, as shown in FIG. 13D. Thus, the thermal oxidation can be easily controlled to form the oxidized layer 14 which includes the entire projections 12 but not the remaining substrate 10. Thereafter, the oxidized layer 14 is etched out to give a smooth top surface of the substrate 10, as shown in FIG. 13E.

Further, it is equally possible to utilize a plasma etching in order to remove the minute projections 12 from the top surface of the substrate 10. In this process, the substrate 10 removed of the porous layer 30 is exposed to a plasma stream to selectively and preferentially etch out the projections remaining on the top surface of the substrate. A spattering etching is made when using argon gas, while a reactive ion etching is made when using $CF_4$ gas, or a mixture gas of $CF_4$ and $O_2$.

Still further, the smoothening may be made by a laser ablation in which a laser beam is irradiated to the top surface of the substrate to selectively and preferentially remove the minute projections.

It should be noted that the anodization process of varying the current density or concentration of the electrolyte solution is preferred, but the present invention is not limited thereto and may equally utilize the anodization without the control of varying these parameters.

Further, the present invention should be interpreted to be not limited to the use of the silicon substrate but to allow the use of other semiconductor materials in combination with specific electrolyte solution as shown in the table below.

| Semiconductor material | Electrolytic solution | Masking material |
|---|---|---|
| Si | HF: $C_2H_5OH$ | SiN |
| Ge | HCl: $C_2H_5OH$ | $SiO_2$, SiN, SiC |
| SiC | HF: $C_2H_5OH$ | SiN |
| GaAs | HCl | $SiO_2$, SiN, SiC |
| GaP | $H_2SO_4$ | $SiO_2$, SiN, SiC |
| InP | HCl | $SiO_2$, SiN, SiC |

In the above table, the mask material available in combination of the semiconductor material and the electrolytic solution are listed.

The invention claimed is:

1. A process of fabricating a semiconductor optical lens, said process comprising the steps of:
   preparing a semiconductor substrate having a flat top surface and a flat bottom surface opposed to each other;
   forming an anode on said bottom surface,
   placing said semiconductor substrate in an electrolyte solution;
   flowing a current between said anode and a cathode within said solution to anodize the top surface of said substrate to a varying depth from portions to portions, leaving a porous layer in said top surface; and
   removing said porous layer from said substrate to leave a curved surface on said top surface, thereby providing the lens having said curved surface on top of said substrate,
   said process being characterized by
   said anode which is deposited and on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, and also by
   including a smoothing step of smoothening out minute projections remaining on said curved surface, wherein said smoothing step follows the step of removing said porous layer and comprises:
   immersing said semiconductor substrate in an etching solution to etch out said minute projections,
   wherein said anode has an anode pattern,
   said anode pattern has an opening, whereby the top surface of said semiconductor substrate has a portion corresponding to said opening,
   said electrical current is flown between said anode and said cathode so as to anodize the top surface of said semiconductor substrate selectively in correspondence to the anode pattern, whereby the portion corresponding to said opening, of the top surface of said semiconductor substrate, is anodized to the varying depth and the portion forms the optical lens.

2. The process as set forth in claim 1, wherein said smoothing step is made to finish said curved surface having a root mean square surface roughness (RMS) of 200 nm or less.

3. The process as set forth in claim 1, wherein said opening has a circular shape.

4. The process as set forth in claim 1, wherein a plurality of semiconductor optical lenses are formed, the process comprising:
   forming an anode having a plurality of openings on the bottom surface,
   placing the semiconductor substrate in an electrolyte solution,
   flowing an electrical current between the anode and the cathode so as to selectively anodize the top surface of the semiconductor substrate in correspondence with the anode pattern such that a plurality of portions of the top surface of the substrate corresponding to the plurality of openings are anodized to the varying depth in match with the distribution of said electric field intensity leaving a porous layer on the top surface,
   removing the porous layer from the substrate to leave a plurality of curved semiconductor lens surfaces on the top surface of the substrate, smoothing out minute projections remaining on the top surface of the substrate by immersing the substrate in an etching solution, and cutting the smoothed substrate into a plurality of semiconductor optical lenses.

5. A process of fabricating a semiconductor optical lens, said process comprising the steps of:
preparing a semiconductor substrate having a flat top surface and a flat bottom surface opposed to each other;
forming an anode on said bottom surface,
placing said semiconductor substrate in an electrolyte solution;
flowing a current between said anode and a cathode within said solution to anodize the top surface of said substrate to a varying depth from portions to portions, leaving a porous layer in said top surface; and
removing said porous layer from said substrate to leave a curved surface on said top surface, thereby providing the lens having said curved surface on top of said substrate, said process being characterized by
said anode which is deposited and on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, and also by
including a smoothing step of smoothening out minute projections remaining on said curved surface, wherein said smoothing step follows the step of removing said porous layer and comprises sub-steps of:
forming an oxidized layer by thermal oxidation in the top of said curved surface, and etching out said oxidized layer to remove said minute projections
wherein said anode has an anode pattern,
said anode pattern has an opening, whereby the top surface of said semiconductor substrate has a portion corresponding to said opening,
said electrical current is flown between said anode and said cathode so as to anodize the top surface of said semiconductor substrate selectively in correspondence to the anode pattern, whereby the portion corresponding to said opening, of the top surface of said semiconductor substrate, is anodized to the varying depth and the portion forms the optical lens.

6. The process as set forth in claim 5, wherein said smoothing step is made to finish said curved surface having a root mean square surface roughness (RMS) of 200 nm or less.

7. A process of fabricating a semiconductor optical lens, said process comprising the steps of:
preparing a semiconductor substrate having a flat top surface and a flat bottom surface opposed to each other;
forming an anode on said bottom surface,
placing said semiconductor substrate in an electrolyte solution;
flowing a current between said anode and a cathode within said solution to anodize the top surface of said substrate to a varying depth from portions to portions, leaving a porous layer in said top surface; and
removing said porous layer from said substrate to leave a curved surface on said top surface, thereby providing the lens having said curved surface on top of said substrate, said process being characterized by
said anode which is deposited and on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, and also by
including a smoothing step of smoothening out minute projections remaining on said curved surface, wherein said smoothing step follows the step of removing said porous layer and comprises exposing said curved surface to a plasma to remove said minute projections,
wherein said anode has an anode pattern,
said anode pattern has an opening, whereby the top surface of said semiconductor substrate has a portion corresponding to said opening,
said electrical current is flown between said anode and said cathode so as to anodize the top surface of said semiconductor substrate selectively in correspondence to the anode pattern, whereby the portion corresponding to said opening, of the top surface of said semiconductor substrate, is anodized to the varying depth and the portion forms the optical lens.

8. The process as set forth in claim 7, wherein said smoothing step is made to finish said curved surface having a root mean square surface roughness (RMS) of 200 nm or less.

9. A process of fabricating a semiconductor optical lens, said process comprising the steps of:
preparing a semiconductor substrate having a flat top surface and a flat bottom surface opposed to each other;
forming an anode on said bottom surface,
placing said semiconductor substrate in an electrolyte solution;
flowing a current between said anode and a cathode within said solution to anodize the top surface of said substrate to a varying depth from portions to portions, leaving a porous layer in said top surface; and
removing said porous layer from said substrate to leave a curved surface on said top surface, thereby providing the lens having said curved surface on top of said substrate, said process being characterized by
said anode which is deposited and on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, and also by
including a smoothing step of smoothening out minute projections remaining on said curved surface, wherein said smoothing step follows the step of removing said porous layer and comprises irradiating a laser beam to said curved surface to remove said minute projections
wherein said anode has an anode pattern,
said anode pattern has an opening, whereby the top surface of said semiconductor substrate has a portion corresponding to said opening,
said electrical current is flown between said anode and said cathode so as to anodize the top surface of said semiconductor substrate selectively in correspondence to the anode pattern, whereby the portion corresponding to said opening, of the top surface of said semiconductor substrate, is anodized to the varying depth and the portion forms the optical lens.

10. The process as set forth in claim 9, wherein said smoothing step is made to finish said curved surface having a root mean square surface roughness (RMS) of 200 nm or less.

11. The process as set forth in anyone of claims 1 to 9, wherein the step of forming said porous layer including to change a parameter of anodizing the top surface of said substrate with time in order to lower the porosity of the porous layer at the interface with the substrate than at the other portion.

12. The process as set forth in claim 11, wherein said parameter is a current density of the current flowing through said anode and said cathode, said current density being controlled to decrease in a final stage of forming said porous layer.

13. The process as set forth in claim 11, wherein said parameter is a concentration of said electrolyte solution, said concentration being controlled to increase in a final stage of forming said porous layer.

* * * * *